United States Patent [19]

Misawa

[11] Patent Number: 5,064,588
[45] Date of Patent: Nov. 12, 1991

[54] METHOD OF MANUFACTURING ELONGATE CERAMIC ARTICLES

[75] Inventor: Hidenobu Misawa, Toyoake, Japan

[73] Assignee: NGK Insulators, Ltd., Japan

[21] Appl. No.: 520,772

[22] Filed: May 8, 1990

[30] Foreign Application Priority Data

May 15, 1989 [JP] Japan .................................. 1-120954
May 15, 1989 [JP] Japan .................................. 1-120955

[51] Int. Cl.⁵ .............................................. F27B 9/14
[52] U.S. Cl. ....................................... 264/57; 432/258; 432/259
[58] Field of Search .................... 264/57; 432/258, 259

[56] References Cited

U.S. PATENT DOCUMENTS

| | | | |
|---|---|---|---|
| 1,485,132 | 2/1924 | Styffe | 264/57 |
| 1,513,617 | 10/1924 | Litt | 264/57 |
| 3,230,596 | 1/1966 | Batigne | 264/57 |

FOREIGN PATENT DOCUMENTS 4425703 10/1969 Japan ..................................... 264/57

Primary Examiner—James Derrington
Attorney, Agent, or Firm—Parkhurst, Wendel & Rossi

[57] ABSTRACT

A method of manufacturing elongate ceramic articles including a plurality of firing stages.

In a pre-firing stage, an elongate ceramic shaped-body is held in a first attitude and subjected to a pre-firing at a predetermined pre-firing temperature to form a pre-fired-body.

In the final firing stage, the pre-fired-body is held in a second attitude, which is different from the first attitude and in which the longitudinal direction of the pre-fired-body is oriented substantially in a vertical direction, and the pre-fired-body is subjected to a firing at a temperature not less than the pre-firing temperature.

The method of the invention allows elongate ceramic articles to be manufactured, without accompanying formation of cracks or fractures induced by tensile stresses due to dead weight of the shaped-body itself. The article so manufactured has substantial homogeneity dimensions and performances throughout the entire length thereof.

12 Claims, 3 Drawing Sheets

FIG_1A
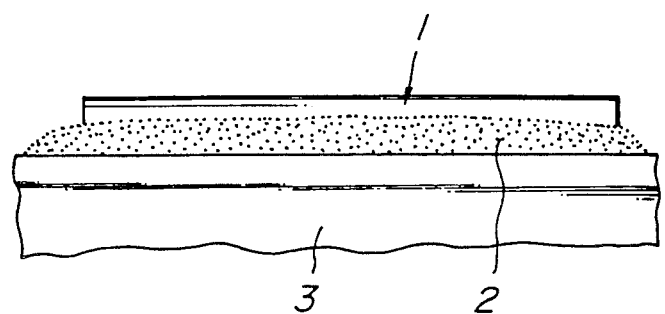
FIG_1B
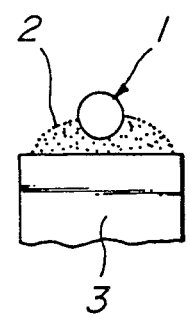
FIG_2A
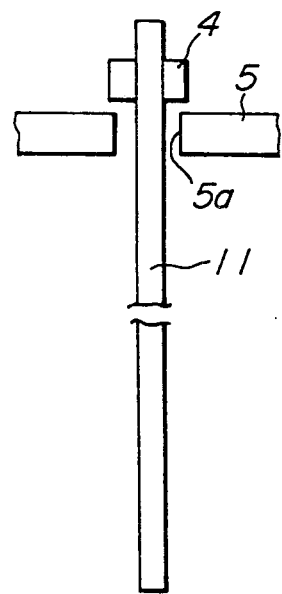
FIG_2B
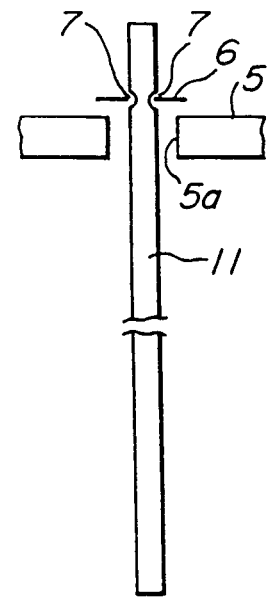
FIG_2C
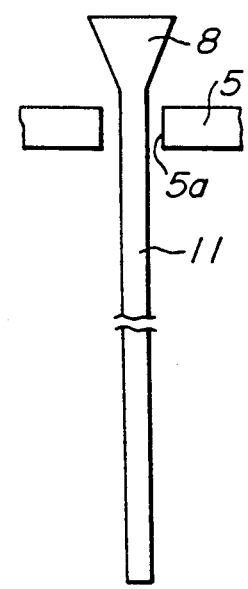

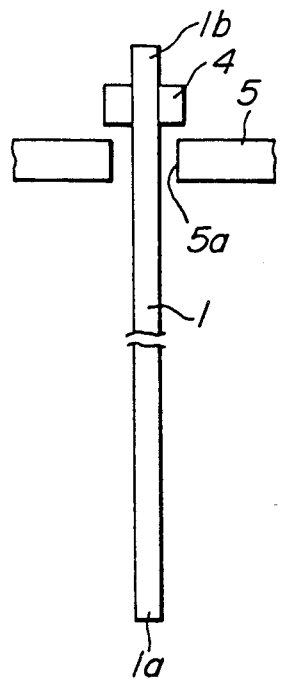 FIG_3A 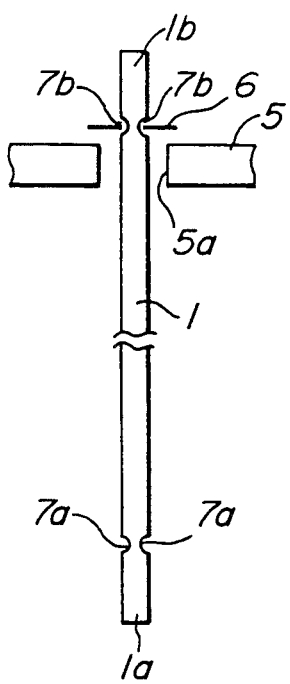 FIG_3B 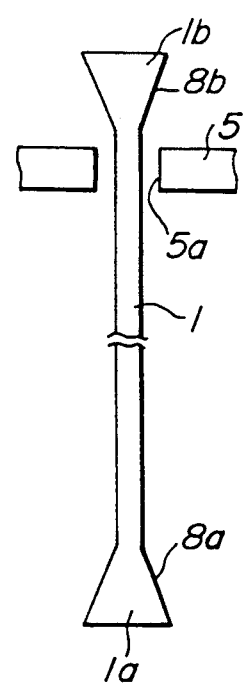 FIG_3C
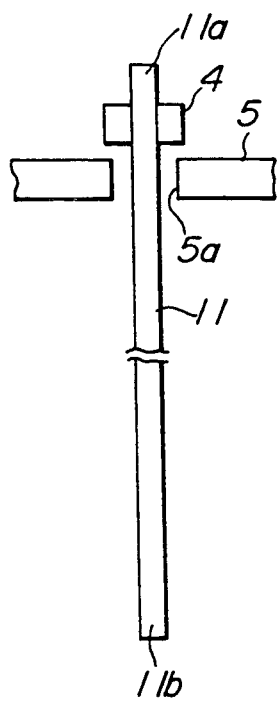 FIG_4A 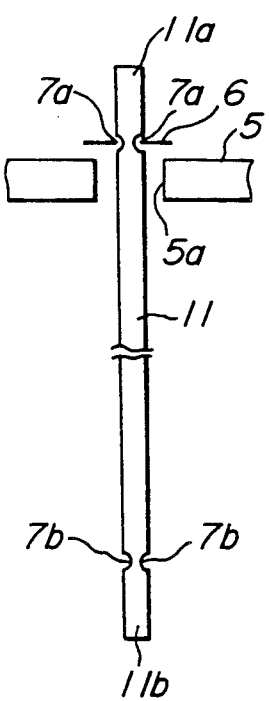 FIG_4B 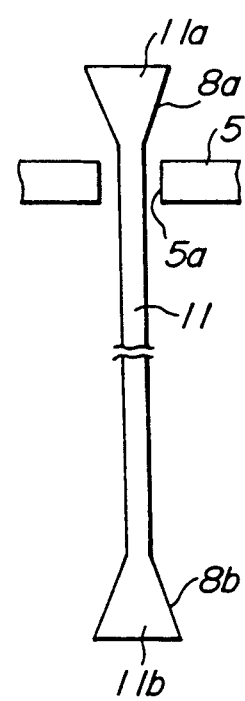 FIG_4C

FIG_5
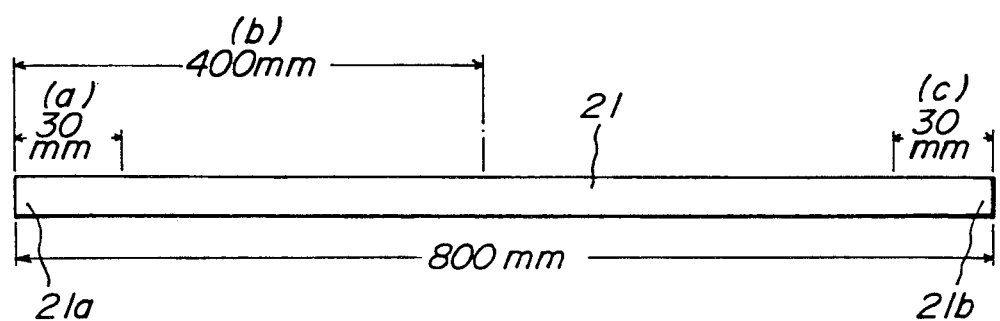

METHOD OF MANUFACTURING ELONGATE CERAMIC ARTICLES

BACKGROUND OF THE INVENTION

1. Field of the Invention

The present invention relates to a method of manufacturing various kinds of elongate ceramic articles, such as ceramic filters, ceramic heaters, ceramic furnace tools, electrode supporting elements, etc.

2. Description of the Related Art

Recently, in manufacturing ceramic elongate articles such as, for example, cylindrical ceramic filters, cylindrical ceramic heaters, ceramic furnace tools, and electrode supporting elements, there has been an increased demand to improve a performance of each ceramic article by enlarging the filtering area, heating area, power generating area, etc. of each article. To meet such a demand, it is of course necessary to make the articles more longer.

Generally, ceramic articles are required to have a high straightness. Therefore, it has been a conventional practice to hang an upper end portion of an elongate ceramic shaped-body on a supporting device and suspend the shaped-body for subjecting it to a firing.

However, when using a ceramic raw material with a large specific gravity, tensile stresses due to the dead weight of the shaped body becomes larger as the shaped-body is made longer, causing not only cracks or fractures in the shaped-body, but also significant differences in dimension and performance (for example, difference in porosity) between the upper end portion and the lower end portion of the shaped-body.

On the other hand, a manufacturing method is known in which a ceramic shaped-body is placed on a table and subjected to a firing in an attitude in which the longitudinal direction of the shaped-body is oriented in a horizontal direction. An elongate ceramic body is obtained after the firing, and is processed into a predetermined dimension. However, the method provides the article with a substantial deflection after the firing, and making it very difficult to subject the article to a high-precision-processing, thereby increasing the manufacturing cost.

SUMMARY OF THE INVENTION

Accordingly, it is an object of the invention to provide a method of manufacturing elongate ceramic articles which is capable of effectively preventing formation of cracks and fractures induced by tensile stresses due to the dead weight of the shaped-body itself during firing the shaped-body while holding the upper end portion thereof.

Another object of the invention is to provide a method which is capable of manufacturing elongate ceramic articles without significant differences in dimensions and performances between both end portions of the article.

In order to achieve these and other objects, according to the invention, there is provided a method of manufacturing elongate ceramic articles, which comprises:

preparing an elongate ceramic shaped-body;

holding the shaped-body in a first attitude and subjecting the shaped-body to a preliminary-firing (referred to as pre firing below) at a predetermined temperature to form a preliminary-fired-body (referred to as a pre-fired-body below); and subsequently holding the pre-fired-body in a second attitude, which is different from the first attitude and in which the longitudinal direction of the pre-fired-body is oriented substantially in a vertical direction, and firing the pre-fired-body at a temperature not less than the predetermined temperature.

The term "vertical direction" as used herein means the direction in which all bodies are drawn by gravity, not only on a planet but also on a floor of a space station when generating artificial gravity in the station.

The invention will be more fully described below.

BRIEF DESCRIPTION OF THE DRAWINGS

FIGS. 1(A) and 1(B) are schematical side and front views, respectively showing the shaped-body placed on a base horizontally and subjected to a pre-firing;

FIGS. 2(A), 2(B) and 2(C) are schematical views showing different embodiments of the main-firing to which the pre-fired-body is subjected, respectively;

FIGS. 3(A), 3(B) and 3(C) are schematical views showing different embodiments of the pre-firing to which the shaped-body is subjected while it is suspended, respectively;

FIGS. 4(A), 4(B) and 4(C) are schematical views showing various embodiments of the final firing to which the pre-fired-body is subjected, respectively; and FIG. 5 is a front view explaining locations of the article where the outer diameter and porosity thereof are measured.

DETAILED DESCRIPTION OF THE INVENTION

In applying the method of manufacturing the articles according to the invention, the shaped-body is held in a first attitude and subjected to a pre-firing so that sintering of the shaped-body proceeds to a certain extent during the pre-firing.

Besides, since the pre-fired-body is held in a second attitude which is different from the first attitude and in which the longitudinal direction of the pre-fired-body is oriented substantially in a vertical direction while the pre-fired-body is subjected to a firing, the pre-fired-body draws itself to a vertical direction by its dead weight thereby improving the straightness and dimensional accuracy of the articles. Moreover, since a pre-firing temperature is not higher than a main-firing temperature, there is little possibility for the structure of the pre-fired-body to grow too hard during the pre-firing, which would make it difficult to correct dimensional inaccuracy of the articles during the subsequent main-firing.

In one embodiment of the invention, the shaped-body is held in a first attitude in which the longitudinal direction of the shaped-body is oriented substantially in a direction different from the vertical direction, and is subjected to the pre-firing. Preferably, in the pre-firing stage, the shaped-body is held in a first attitude in which the longitudinal direction of the shaped-body is oriented substantially in a horizontal direction, and is subjected to the pre-firing. In this embodiment, it is possible to effectively prevent occurrence of cracks and fractures caused by tensile stresses due to the dead weight of the shaped-body and eliminate differences in dimensions and performances from one end portion to the other end portion of the articles.

In this embodiment of the invention, the shaped-body is preferably subjected to the pre-firing at a temperature not less than the temperature which initiates shrinkage of the ceramic raw material forming the shaped-body. The pre-firing, carried out prior to a main-firing, causes the structure of the shaped-body to undergo a shrinkage to a certain extent, thereby improving its high temperature strength. The subsequent main-firing, in turn, makes it possible to effectively prevent occurrence of cracks and fractures caused by the dead weight of the pre-fired-body, because its high temperature strength has already been improved.

In the other embodiment of the invention, the shaped-body is held in an attitude in which the longitudinal direction of the shaped-body is oriented substantially in the vertical direction with one end portion of the shaped-body forming the lowermost end portion and the shaped-body is then subjected to the pre-firing. Subsequently, the resultant pre-fired-body is turned upside down, and the pre-fired-body is held in the attitude in which an longitudinal direction of the pre-fired-body is oriented substantially in the vertical direction with the one end portion of the pre-fired-temperature body forming the uppermost end portion, to subject the pre-fired-body to a firing. In this embodiment, each part of the shaped-body is loaded in an opposite sense between the pre-firing stage and the main-firing stage, making it possible to correct, during the main-firing, differences in diameter, porosity, etc. from one end portion to the other end portion of the pre-fired-body, which have been caused as a result of the preliminary-firing. Consequently, it is possible to manufacture elongate ceramic articles with homogeneous structure, having very small differences in dimensions and performances such as porosity or so from one end portion to the other end portion.

In this embodiment of the invention, the shaped-body is preferably subjected to the pre-firing at a temperature not less than the temperature which initiates shrinkage of ceramic raw material forming the shaped-body. This pre-firing, carried out prior to a main-firing, makes the structure of the shaped-body undergo a shrinkage to a certain extent and improves its high temperature strength. The subsequent main-firing makes it possible to effectively prevent occurrence of cracks and fractures caused by the dead weight of the pre-fired-body, because its high temperature strength has already been improved.

Preferably, a firing temperature at which the pre-fired-body is subjected to firing is higher than a pre-firing temperature by approximately 50° to 150° C. If the difference of the temperatures is smaller than 50° C., the structure of the shaped-body undergoes an excessive sintering during the pre-firing, giving rise to a tendency to provide a relatively poor effect of correction for compensating for differences in dimensions, etc., during the main-firing. On the other hand, if the temperature difference is larger than 150° C., there is a tendency to form a relatively smaller diameter in the upper end portion of the article after the main-firing.

The invention will be explained more in detail with reference to the drawings.

FIG. 1(A) is a schematic side view showing the shaped-body 1 subjected to a pre-firing;

FIG. 1(B) is a front view thereof; and

FIGS. 2(A), 2(B) and 2(C) are schematic views showing the pre-fired-body subjected to a main-firing after the pre-firing, respectively.

In this embodiment, first an elongate ceramic shaped-body 1 is placed on laying powder 2, which is composed of a material exhibiting a poor tendency to react with the shaped-body 1 at a pre-firing temperature, and which is laid on a firing base 3. Subsequently, the shaped-body 1 is subjected to the pre-firing in an attitude in which the shaped-body 1 is held and oriented horizontally. A temperature during this stage is set to not less than the temperature which initiates the shrinkage of ceramic raw material forming the shaped-body 1. After the pre-firing, the resultant preliminary fired body 11 is suspended in a manner shown in FIG. 2(A), 2(B) or 2(C), and is subjected to the main-firing at a temperature not less than the pre-firing temperature.

In FIG. 2(A), a collar 4 is attached to the upper end portion of the pre-fired-body, which is passed through a through-hole 5a in a supporting portion 5, and the pre-fired-body is supported by engaging the collar 4 with the supporting portion 5. Consequently, the pre-fired-body 11 hangs vertically downwards by its dead weight. In the example shown in FIG. 2(B), a hole 7 is formed in the upper end portion of the pre-fired-body 11, and a suspension rod 6 is inserted into the hole 7. The pre-fired-body 11 is suspended by engaging the suspension rod 6 with the supporting portion 5. In the example shown in FIG. 2(C), a tapered portion 8 is formed in the upper end portion of the pre-fired-body 11, which is suspended by engaging the tapered portion 8 with the supporting portion 5.

In this embodiment, the shaped-body 1 is subjected to the pre-firing in an attitude in which the longitudinal direction of the shaped-body 1 is oriented substantially in a horizontal direction, under the pre-firing temperature not less than the temperature which initiates the shrinkage of ceramic raw material. The pre-firing, carried out prior to the main-firing, causes the structure of the shaped-body 1 to undergo a shrinkage to a certain extent, to improve its high temperature strength. Subsequently, by holding the upper end portion of the pre-fired-body 11, suspending the same and subjecting it to the firing at a temperature not less than the preliminary-firing temperature, it is possible to improve the high temperature strength of the pre-fired-body 11, effectively preventing fractures due to its dead weight. The pre-fired-body 11 can be subjected to the firing while loading its dead weight vertically along the longitudinal direction of the pre-fired-body, to provide an excellent straightness in the longitudinal direction.

When the pre-firing temperature is lower than the temperature which initiates the shrinkage of ceramic raw material, only cleaning of the raw material is performed during the pre-firing; consequently, in the case when the shaped-body 1 is lengthened, it becomes impossible to obtain a sufficient strength to properly handle the pre-fired-body 11 when suspending the body 11 and subjecting the same to the firing.

Besides if the pre-firing temperature is higher than a temperature during the subsequent main-firing, the structure of the pre-fired-body 11 becomes excessively densified in the pre-firing, making it difficult to obtain the effect for correcting straightness along the longitudinal direction of the pre-fired-body by suspending the body 11 and subjecting it to the firing after the pre-firing. Consequently, the resulting article has an inadequate dimensional accuracy.

As described above, the present embodiment comprises holding the shaped-body 11 in a horizontal direction, subjecting the same to the pre-firing at a temperature not less than the temperature which initiates the shrinkage of ceramic raw material, holding the upper end portion of the pre-fired-body 11 to suspend the body, and subjecting the same to the main-firing at a temperature not less than the pre-firing temperature. The unique combination of these process steps serves to simultaneously solve the problems, such as high straightness and prevention of fractures, which are contradicting each other, and it thus becomes possible to manufacture elongate articles longer than prior ones.

Besides, in the pre-firing, while it is generally preferable to subject the shaped-body 1 to the pre-firing in the attitude in which the longitudinal direction of the body 1 is oriented substantially in a horizontal direction, it is still also possible to subject the shaped-body 1 to the pre-firing in the attitude in which the longitudinal direction of the shaped-body 1 is oriented at a predetermined angle to a vertical direction.

In the above embodiment, a secondary pre-firing may be carried out after the primary pre-firing and prior to the main-firing.

In this case, after the primary pre-firing of the shaped-body as described above, the upper end portion of the pre-fired-body is held so that the pre-fired-body is suspended to orient its longitudinal direction substantially in a vertical direction with one end portion of the body forming the lowermost end portion, and the pre-fired-body is subjected to the secondary pre-firing at a temperature not less than the temperature which initiates shrinkage of ceramic raw material.

Subsequently, after the secondary pre-firing, the resultant pre-fired-body is turned upside down and subjected to the main-firing. Namely, the upper end portion of the resultant pre-fired-body is held and the pre-fired-body is suspended to orient its longitudinal direction substantially in a vertical direction with the above-mentioned end portion forming the uppermost end portion, and the pre-fired-body then being subjected to the main-firing.

In this embodiment, a firing temperature during the main-firing is preferably approximately 50° to 150° C. higher than the temperature at which the pre-fired-body is subjected to the secondary pre-firing.

Other embodiments of the invention will be described below with reference to FIGS. 3(A), 3(B) and 3(C) which are schematic views showing the shaped-body 1 subjected to the pre-firing, respectively, and in FIGS. 4(A), 4(B) and 4(C) which are schematic views showing the pre-fired-body 11 oriented upside down and subjected to the main-firing, respectively.

In this embodiment, the pre-firing is performed with the ceramic shaped-body suspended in a manner shown in FIGS. 3(A), 3(B) or 3(C).

In FIG. 3(A), one end portion 1a of the shaped-body 1 forms the lowermost end portion of the shaped body 1. The collar 4 is attached to the other end portion 1b of the shaped-body, which is passed through the through-hole 5a of the supporting portion 5, and the shaped-body 5 is supported by engaging the collar 4 with the supporting portion 5. Consequently, the shaped-body 1 hangs down by its dead weight in a vertical direction. In the example shown in FIG. 3(B), another hole 7b is formed in the other end portion 1b of the shaped-body 1, and the suspension rod 6 is inserted into the hole 7b. The shaped-body is suspended by engaging the suspension rod 6 with the supporting portion 5. In the example shown in FIG. 3(C), another tapered portion 8b is formed in the end portion 1b of the shaped-body 1, which is suspended by engaging the tapered portion 8b with the supporting portion 5.

Next, after completion of the pre-firing as described above, the pre-fired-body 11 is turned upside down so that the other end portion 11b of the pre-fired-body forms the lowermost portion. The pre-fired-body is subjected to the main-firing in the attitude shown in FIG. 4(A), 4(B) or 4(C). A firing temperature during the main-firing is made higher than the pre-firing temperature. Suspending methods shown in FIGS. 4(A), 4(B) and 4(C) are respectively the same as those shown in FIGS. 3(A), 3(B) and 3(C), except that the pre-fired-body 11 is turned upside down. Namely, in the example shown in FIG. 4(A), the collar 4 is attached to one end portion 11a of the pre-fired-body 11 to support the body 11. Besides, in the example shown in FIG. 4(B), the hole 7a is formed in one end portion 11a, and the suspension rod 6 is inserted into the hole 7a, and the pre-fired-body 11 is supported by the suspension rod 6. In the example shown in FIG. 4(C), the pre-fired-body 11 is supported by the tapered portion 8a formed in one end portion 11a, while the tapered portion 8b formed in the other end portion 11b forms the lowermost end portion of the body. Of course, although the shaped-body can be suspended as shown in FIG. 3(A) and subjected to the pre-firing, and the resultant pre-fired-body can then be turned upside down, such that the body is suspended as shown in FIG. 4(B) or FIG. 4(C) and subjected to the main-firing, various combinations of suspending methods can be selected as appropriate.

This embodiment provides, as described above, a novel firing method with considerable features, which comprises holding the uppermost end portion(the other end portion 1b) of the shaped-body to suspend the shaped-body, subjecting the same to the pre-firing, subsequently turning the resulting pre-fired-body 11 upside down, holding one end portion 11a of the pre-fired-body 11 to suspend it and subjecting the pre-fired-body 11 to the firing at the temperature higher than the pre-firing temperature.

Namely, first by the pre-firing, sintering of the shaped-body 11 proceeds to a certain extent to densify its structure. Of course, particularly when the shaped-body 1 is lengthened, a higher load is applied to the other end portion 1b, as compared with the one end portion 1a, by the dead weight of the shaped-body 1, the shaped-body 1 is subjected to a higher elongation on the side near the other end portion 1b, as compared with the side near one end portion 1a (the lowermost portion), and the porosity near the end portion 1b becomes higher.

However, since the resulting pre-fired-body 11 is subsequently turned upside down and subjected to the main-firing, this time the end portions 11a, 11b now form the uppermost and lowermost end portions, respectively, so that the nearer to the uppermost end portion 11a, the higher the load becomes. Consequently, when the main-firing is performed in this reversed condition, the length and the porosity on the uppermost end portion 11a becomes larger than on the other lowermost end portion 11b. This means that the differences in dimensions and porosity of the pre-fired-body between its upper side and lower side can be corrected during the subsequent main-firing, making it possible to provide an elongate article without significant differences in dimensions and performances from its one end portion to the other end portion as a whole. Moreover, it is possible to carry out the firing with respect to pre-fired-bodies which are longer than prior ones.

On this occasion, it is important to maintain the main-firing temperature higher than the pre-firing temperature. If the pre-firing temperature is not less than the main-firing temperature, structure of the pre-fired-body 11 becomes excessively sintered in the pre-firing, making it difficult to correct the differences in dimensions and porosity of the pre-fired-body 11 between its upperside and lowerside during the main-firing, because the above differences have already become fixed before the main-firing.

Preferably, the main-firing temperature is 50 to 150° C. higher than the pre-firing temperature.

If the difference between the temperatures is smaller than 50° C., structure of the shaped-body is too densified during the pre-firing, giving rise to a tendency to provide relatively poor effect for correcting the differences of the dimensions or so during the main-firing. On the other hand, if the temperature difference is larger than 150° C., it is exhibited a tendency to give a relatively smaller diameter on the side near one end portion 11a and to make the dimension of the article longer on the same side after the main-firing.

Besides, it is preferable from the viewpoint of increasing strength to the pre-fired-body that the pre-firing temperature is not less than the temperature which initiates shrinkage of the ceramic raw material forming the shaped-body.

The outer profile of the ceramic article may be selected from various shapes, such a rectangle, circle triangle, etc. Moreover, the article may be cylindrical with its inner profile selected from various shapes such as a rectangle, circle, triangle, etc.

When applying the invention to the production of ceramic heaters, it is possible to lengthen the heaters more than is conventional, thereby increasing its heating area. When applying the invention to the production of ceramic filters, it is similarly possible to increase the filtering area and the filtering speed of the filters more than is conventional, and moreover to maintain the desired filtering speed of the filter as a whole even when using densified filters because of the increased filtering area as described above.

Moreover, when applying the invention to the production of electrode supporting elements of fuel cells, especially of solid oxide fuel cells, it is possible to increase the electric power generated per one element by lengthening each element, and to lower the manufacturing cost per unit electric power.

Material, dimensions, shape, etc. of the ceramic articles manufactured by the invention may be changed in various manners, and the shaping method of the articles may be selected from known processes, such as casting, extrusion, a pressing, etc.

The present invention will be further explained below, with reference to some specific actual examples.

EXAMPLE 1

Elongate ceramic shaped-rods made of $ZrO_2$, with 20 mm outer diameter, and having the length within the range of 300 mm ~ 2000 mm respectively, as shown in Table 1, were prepared by an extrusion method. These rods were supported in an attitude in which the longitudinal direction of the rod is oriented substantially in a horizontal direction as shown in FIGS. 1(A), 1(B), and subjected to the pre-firing at the pre-firing temperature shown in Table 1, respectively. Subsequently, the resulting ceramic pre-fired-rods were suspended as shown in FIG. 2(B) and subjected to the firing at the firing temperature of 1450° C. which is not less than the pre-firing temperatures.

An alumina rod with 3 mm diameter was used as a suspension rod 6 (refer to FIG. 2(B)). In the present example, the temperature which initiates shrinkage of $ZrO_2$, as ceramic raw material, is 1250° C.

The experimental results are as shown in Table 1. In Table 1, "⊙" indicates that fractures and cracks were not found in the pre-fired-rod when suspending the same to subject it to the firing, "Δ" indicates that cracks were caused in the pre-fired-rod but not fractures, "x" indicates that fractures were caused in the pre-fired-rod, and "-" indicates that the pre-fired-rod did not have sufficient strength to permit a proper handling.

TABLE 1

| | | Length (mm) | | | | | | | | |
|---|---|---|---|---|---|---|---|---|---|---|
| | | 300 | 500 | 700 | 900 | 1100 | 1300 | 1500 | 1700 | 2000 |
| No pre-firing | | ⊙ | X | X | X | — | — | — | — | — |
| The pre-firing temperature | 1200° C. | — | — | — | — | — | — | — | — | — |
| | 1250° C. | ⊙ | ⊙ | Δ | Δ | Δ | Δ | Δ | X | X |
| | 1300° C. | ⊙ | ⊙ | ⊙ | ⊙ | ⊙ | ⊙ | Δ | Δ | Δ |
| | 1350° C. | ⊙ | ⊙ | ⊙ | ⊙ | ⊙ | ⊙ | ⊙ | ⊙ | Δ |
| | 1400° C. | ⊙ | ⊙ | ⊙ | ⊙ | ⊙ | ⊙ | ⊙ | ⊙ | ⊙ |
| | 1450° C. | ⊙ | ⊙ | ⊙ | ⊙ | ⊙ | ⊙ | ⊙ | ⊙ | ⊙ |

Moreover, in the above example, the pre-firing temperature for the shaped-rod with 900 mm length was set up as shown in Table 2, and the straightness of each resulting rod-shaped article was measured. The result is as shown in Table 2.

TABLE 2

| | The pre-firing temperature | | | | |
|---|---|---|---|---|---|
| | 1250 | 1300 | 1350 | 1450 | 1500 |
| Straightness (mm) | 0.12 | 0.26 | 0.31 | 1.38 | 1.61 |

EXAMPLE 2

Elongate ceramic shaped-rods made of $ZrO_2$ with 20 mm outer diameter and 800 mm length were prepared by an extrusion method. These rods were suspended as shown in FIG. 3(B) and subjected to the pre-firing at the pre-firing temperature shown in Table 3, respectively. Subsequently, the resulting preliminary-fired-rods were turned upside down, suspended as shown in FIG. 4(B), and subjected to the firing at the firing temperature 1600° C.

An aumina rod with 3 mm diameter was used as a suspension rod 6 (refer to FIG. 3(B)). In the present example, the temperature which initiates shrinkage of ceramic raw material is 1250° C.

Subsequently, the rod-shaped articles 21 (refer to FIG. 5) were manufactured according to each example shown in FIGS. 3(A)-3(C), respectively, and the outer diameter and the porosity of the resulting articles after the main-firing were measured on selected three points, respectively. The measuring points were point (a), which is at a distance of 30 mm from the end on the end 21a of the article 21, point (b), which is at the distance of 400 mm from the above end, and point (C), which is at a distance of 30 mm from the opposite end on the other end portion 21b. The experimental results are as shown in Table 3.

TABLE 3

|  |  | Measuring point (a) | (b) | (c) | Difference |
|---|---|---|---|---|---|
| No pre-firing | diameter mm | 15.4 | 16.4 | 13.6 | 1.8 |
|  | porosity % | 17.4 | 19.1 | 21.0 | 3.6 |
| The pre-firing temperature |  |  |  |  |  |
| 1350° C. | diameter mm | 15.7 | 16.1 | 16.6 | 0.9 |
|  | porosity % | 19.9 | 18.8 | 18.3 | 1.6 |
| 1400° C. | diameter mm | 15.8 | 16.2 | 16.4 | 0.6 |
|  | porosity % | 19.1 | 18.8 | 18.4 | 0.7 |
| 1450° C. | diameter mm | 15.9 | 15.9 | 16.1 | 0.2 |
|  | porosity % | 18.7 | 18.5 | 18.3 | 0.4 |
| 1500° C. | diameter mm | 15.9 | 15.8 | 15.8 | 0.1 |
|  | porosity % | 18.5 | 18.4 | 18.5 | 0.1 |
| 1550° C. | diameter mm | 15.9 | 15.8 | 15.6 | 0.3 |
|  | porosity % | 18.1 | 18.4 | 18.5 | 0.4 |
| 1600° C. | diameter mm | 16.2 | 15.6 | 14.6 | 1.6 |
|  | porosity % | 16.6 | 18.2 | 19.8 | 3.2 |

As can be appreciated from Table 3, when the pre-firing was not performed or the pre-firing temperature was equal to the main-firing temperature (1600° C.), the difference in diameter and porosity were very significant on each measuring point. Moreover, when the pre-firing temperature was 1450~1550° C., the differences in diameter and porosity on each measuring point became very small, indicating formation of a homogenized structure of the articles.

What is claimed is:

1. A method of manufacturing elongate ceramic articles each having a longitudinal direction, which comprises:
   preparing an elongate ceramic shaped-body;
   holding the shaped-body in a first attitude and subjecting the shaped-body to a pre-firing at a predetermined temperature to form a pre-fired-body; and
   subsequently holding the pre-fired-body in a second attitude, which is different from said first attitude and in which the longitudinal direction of the pre-fired-body is oriented in a substantially vertical direction, and subjecting the pre-fired-body to a firing at a temperature not less than said predetermined temperature.

2. The method of manufacturing elongate ceramic articles, as claimed in claim 1, wherein said first attitude is an attitude in which the longitudinal direction of the shaped-body is oriented in a substantially different direction than the vertical direction.

3. The method of manufacturing elongate ceramic articles, as claimed in claim 2, wherein said first attitude is an attitude in which the longitudinal direction of the shaped-body is oriented in a substantially horizontal direction.

4. The method of manufacturing elongate ceramic articles, as claimed in claim 3, wherein a powder is prepared, which exhibits a poor tendency to react with the shaped-body at said predetermined temperature, and which is laid on a base, said shaped-body being set on the powder in said first attitude and subjected to said preliminary-firing.

5. The method of manufacturing elongate ceramic articles, as claimed in claim 2, which comprises holding an upper end portion of the pre-fired-body and suspending the pre-fired-body to orient the longitudinal direction of the pre-fired body in a substantially vertical direction.

6. The method of manufacturing elongate ceramic articles, as claimed in claim 2, wherein said predetermined temperature is not less than a temperature which initiates shrinkage of ceramic raw material forming the shaped-body.

7. The method of manufacturing elongate ceramic articles, as claimed in claim 6, which comprises:
   holding, after the pre-firing of the shaped-body, one end portion of the pre-fired body forming an uppermost and portion and suspending the pre-fired-body to orient the longitudinal direction of the pre-fired-body in a substantially vertical direction with an other end portion of the pre-fired-body forming a lowermost end portion, and subjecting the pre-fired-body to a secondary pre-firing at a temperature not less than the temperature which initiates shrinkage of ceramic raw material forming the shaped-body; and
   subsequently after the secondary pre-firing holding an end portion of the secondary pre-fired-body, corresponding to the other end portion of the pre-fired body, and suspending the secondary pre-fired-body to orient the longitudinal direction of the secondary pre-fired-body in a substantially vertical direction with the end portion of the secondary pre-fired-body forming an uppermost end portion, and subjecting the secondary pre-fired-body to said firing.

8. The method of manufacturing elongate ceramic articles, as claimed in claim 7, wherein a firing temperature at which the pre-fired-body is subjected to said firing after the secondary pre-firing is higher than the temperature at which the pre-fired-body is subjected to the secondary pre-firing by approximately 50–150 °.

9. The method of manufacturing elongate ceramic articles, as claimed in claim 1, wherein said first attitude is an attitudes in which the longitudinal direction of the shaped-body is oriented in a substantially vertical direction with one end portion of the shaped-body forming a lowermost end portion and an other end portion of the shaped body forming an uppermost end portion;
   and said second attitude is an attitude in which the longitudinal direction of the pre-fired-body is oriented in a substantially vertical direction with an end portion of the pre-fired-body, corresponding to said one end portion of the shaped-body, forming an uppermost end portion.

10. The method of manufacturing elongate ceramic articles, as claimed in claim 9, wherein
    the other end portion of the shaped-body is held and the shaped-body is suspended to orient the longitudinal direction of the shaped-body in a substantially vertical direction; and
    the end portion of the pre-fired-body is held and the pre-fired-body is held and the pre-fired-body is suspended to orient the longitudinal direction of the pre-fired-body in a substantially vertical direction.

11. The method of manufacturing elongate ceramic articles, as claimed in claim 9, wherein said predetermined temperature is not less than the temperature which initiates shrinkage of ceramic raw material forming the shaped-body.

12. The method of manufacturing elongate ceramic articles, as claimed in claim 11, wherein a firing temperature at which the pre-fired-body is subjected to firing is approximately 50°–150° C. higher than said predetermined temperature.

* * * * *